United States Patent
Jung

(10) Patent No.: US 7,428,235 B2
(45) Date of Patent: Sep. 23, 2008

(54) METHOD FOR CONTROLLING CELL TRANSMISSION ON A BASIS OF ONE BYTE BETWEEN FIFOS OF UTOPIA INTERFACE

(75) Inventor: Young-Seo Jung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 954 days.

(21) Appl. No.: 10/747,275

(22) Filed: Dec. 30, 2003

(65) Prior Publication Data

US 2004/0151183 A1      Aug. 5, 2004

(30) Foreign Application Priority Data

Jan. 21, 2003   (KR) .................... 10-2003-0004139

(51) Int. Cl.
  *H04L 12/28*   (2006.01)
(52) U.S. Cl. .................... 370/395.1; 370/400; 370/401; 370/466; 370/469
(58) Field of Classification Search ................ 370/400, 370/401, 466, 469, 395.1
  See application file for complete search history.

(56) References Cited

U.S. PATENT DOCUMENTS

| | | | |
|---|---|---|---|
| 5,418,786 A * | 5/1995 | Loyer et al. ............... | 370/395.4 |
| 5,960,215 A * | 9/1999 | Thomas et al. ............. | 710/52 |
| 6,292,487 B1 | 9/2001 | Kunito et al. | |
| 6,480,499 B1 | 11/2002 | Richards et al. | |
| 6,594,237 B1 | 7/2003 | Kiuchi et al. | |
| 6,952,420 B1 * | 10/2005 | Castellano ............... | 370/395.6 |
| 7,072,292 B2 * | 7/2006 | Novick et al. ............. | 370/217 |
| 2002/0009089 A1 * | 1/2002 | McWilliams ............... | 370/401 |
| 2002/0031141 A1 * | 3/2002 | McWilliams ............... | 370/463 |
| 2002/0136220 A1 | 9/2002 | Anjanaiah et al. | |
| 2003/0043808 A1 | 3/2003 | Chen et al. | |
| 2004/0202179 A1 * | 10/2004 | Tan et al. ................. | 370/395.1 |

* cited by examiner

*Primary Examiner*—Edan Orgad
*Assistant Examiner*—Andrew C Lee
(74) *Attorney, Agent, or Firm*—Robert E. Bushnell, Esq.

(57) ABSTRACT

A method for controlling cell transmission on a basis of 1 byte between FIFOs of a UTOPIA interface, thereby performing cell transmission more speedily and more smoothly, which is achieved by advancing start timing of cell transmission by defining active timing of cell enable signal and cell available (CA) signal between FIFOs of the UTOPIA interface to a moment when a 1-byte data is available. The CA signal becomes active (high signal) when a TX FIFO has data with greater than 1 byte and a RX FIFO is able to receive data with greater than 1 byte. The cell enable (Enb) signal becomes active when an input CA signal in the TX FIFO is in a 'high' state and the TX FIFO has data with greater than 1 byte to be transmitted, and when an input CA signal in the RX FIFO is in a 'high' state and the RX FIFO is able to receive data with greater than 1 byte. As a result, a cell can be transmitted much faster as much as 52 bytes*clock and traffic performance of system can be improved considerably.

22 Claims, 4 Drawing Sheets

METHOD FOR CONTROLLING CELL TRANSMISSION ON A BASIS OF ONE BYTE BETWEEN FIFOS OF UTOPIA INTERFACE

CLAIM OF PRIORITY

This application makes reference to, incorporates the same herein, and claims all benefits accruing under 35 U.S.C. § 119 from an application for METHOD FOR CONTROLLING START TIMING OF CELL TRANSMISSION EVERY ONE BYTE BASIS OF BETWEEN FIFO OF UTOPIA INTERFACE earlier filed in the Korean Intellectual Property Office on 21 Jan. 2003 and thereby duly assigned Ser. No. 2003-4139.

BACKGROUND OF THE INVENTION

1. Field of the Invention

The present invention relates to a UTOPIA (Universal Test & Operations Physical layer Interface for ATM (Asynchronous Transfer Mode)) interface, and more particularly, to a method for controlling cell transmission on a basis of 1-byte between FIFOs (First-In-First-Out) of a UTOPIA interface, in order to perform cell transmission faster and more smoothly by defining an active timing of a cell enable signal and a cell available signal between FIFOs of the UTOPIA interface as when 1-byte of data is present.

2. Description of the Related Art

In general, the data transmission mode of a UTOPIA interface in an asynchronous transfer mode (ATM) can be divided into two kinds: Cell-level handshaking mode and Octet-level handshaking mode. In the cell-level handshaking mode, data is transmitted in a 53-byte unit (cell unit) and in the octet-level handshaking mode data is transmitted in an 8-bits unit (octet unit).

In data transmission between FIFOs of the UTOPIA interface that is primarily performed in the cell-level handshaking mode, in reality, however, when a cell is stored in or outputted from the FIFO, a 53-byte cell is piled up in the FIFO or outputted from the FIFO successively. For instance, it is least likely to happen that only 20 bytes out of 53 bytes of a cell are stored first and the remaining 33 bytes are stored after a short interruption.

Therefore, when cell data transmission is controlled according to the related art, the TX FIFO (transmit First-In-First-Out) has to wait until all of the 53 bytes are stored while the RX FIFO (receive First-In-First-Out) has to wait until storage for a 53-byte data is created, thereby wasting as much as 53 bytes*clock.

SUMMARY OF THE INVENTION it is, therefore, an object of the present invention to provide a method for controlling start timing of cell transmission on a basis of one byte between FIFOs of a UTOPIA interface in order to improve performance of traffic transmission, by defining a start timing of cell transmission, that is, a CA signal becomes active in a 'high' state when a RX FIFO has storage for a 1-byte data and when the TX FIFO outputs a 1-byte data, thereby transmitting a cell as fast as 52 bytes*clock.

To achieve the above and other objects, a method is provided for controlling cell transmission on a basis of 1-byte between FIFOs (First-In-First-Out) of a UTOPIA interface in a Cell-level handshaking mode, the method including the steps of: when a TX FIFO is a master and a RX FIFO is a slave, activating a RX cell available (CA) signal at a first clock edge whenever the RX FIFO has storage space for greater than 1-byte data; if the TX FIFO stores a more than 1-byte for transmission, latching, at the TX FIFO, the activated RX CA signal at a second clock edge which immediately follows the first clock edge, and activating an enable (Enb) signal of the TX FIFO; and activating an Enb signal of the RX FIFO.

Another aspect of the present invention provides a method for controlling cell transmission on a basis of 1-byte between FIFOs (First-In-First-Out) of a UTOPIA interface in a Cell-level handshaking mode, the method including the steps of: when a TX FIFO is a slave and a RX FIFO is a master, activating a TX cell available (CA) signal at a first clock edge when the TX FIFO stores more than 1-byte for transmission; if the TX FIFO has storage for greater than 1 byte data, latching, at the RX FIFO, the activated TX CA signal at which immediately follows the first clock edge, and activating an enable (Enb) signal of the RX FIFO; and activating an Enb signal of the TX FIFO.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1A:
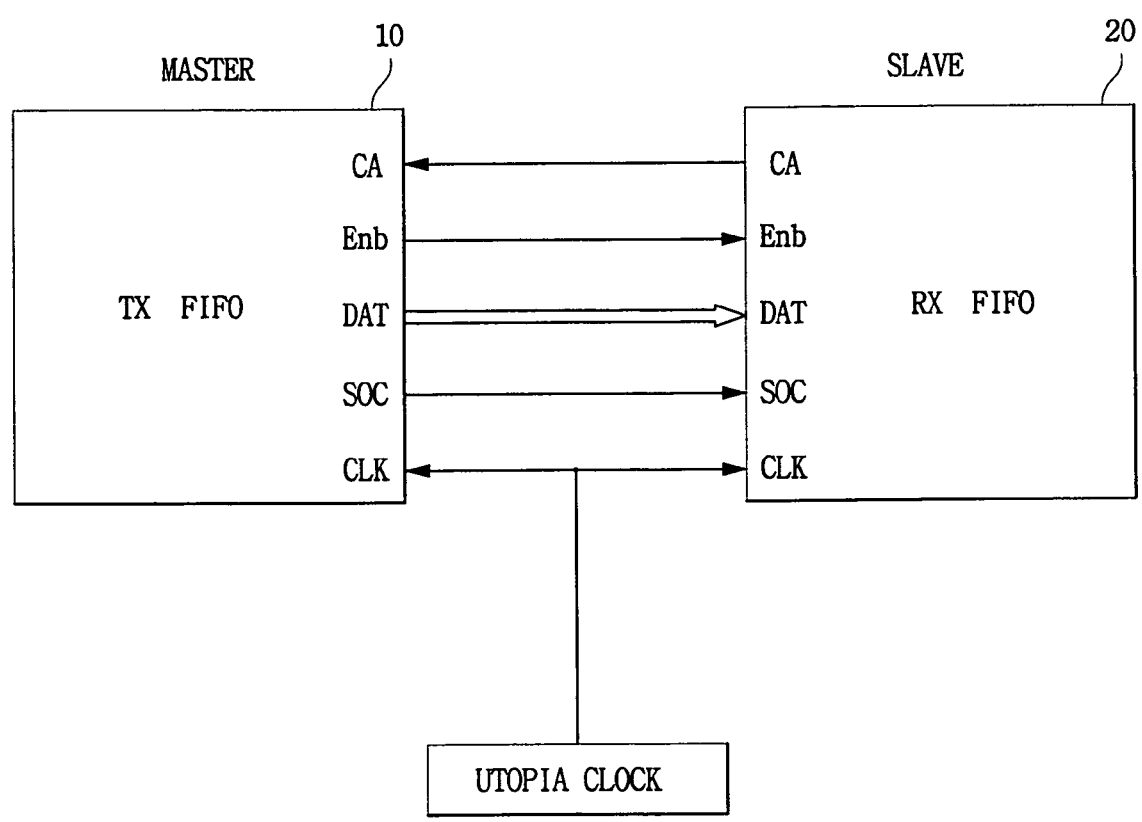
FIG. 1a illustrates transmitting/receiving a control signal when a TX FIFO is a master.
Figure 1B:
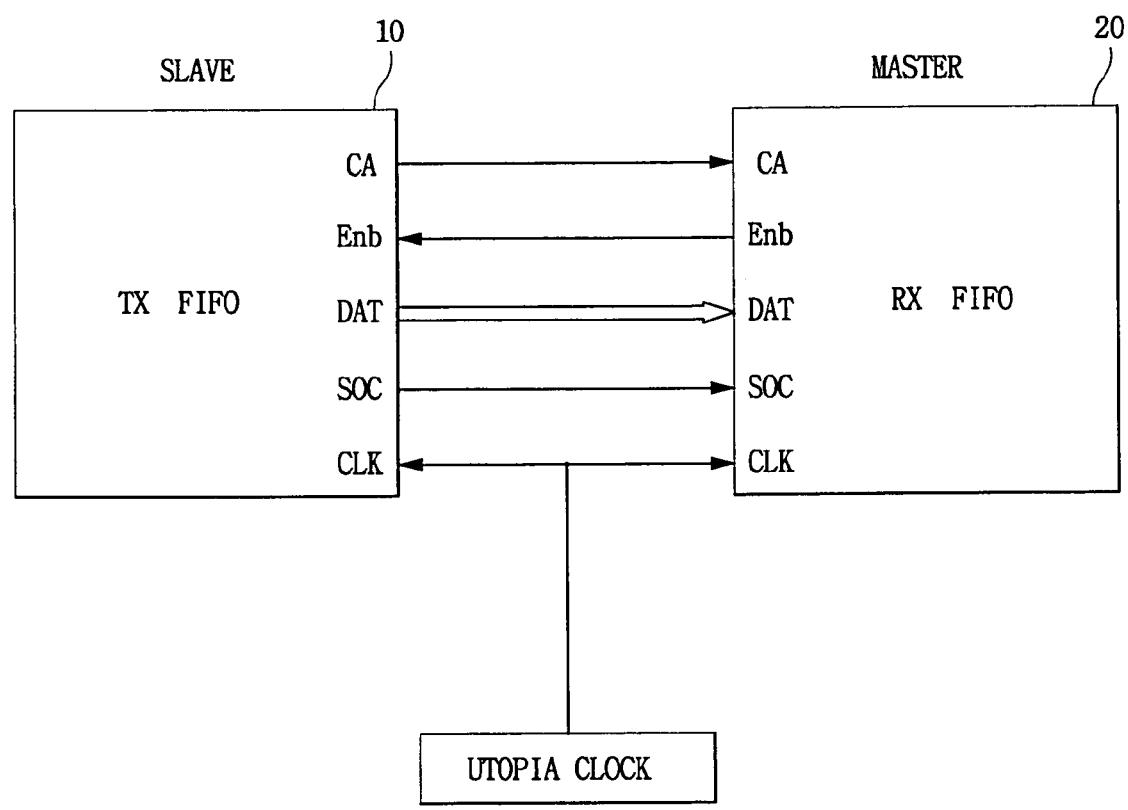
FIG. 1b illustrates transmitting/receiving a control signal when a TX FIFO is a slave.

Turning now to the drawings, data transmission between FIFOs of the UTOPIA interface is primarily performed in the cell-level handshaking mode. Referring to FIGS. 1A and 1B, the following details the data transmission between FIFOs of the UTOPIA interface based on the cell-level handshaking mode.

FIG. 1A illustrates transmitting/receiving a control signal in case of a TX FIFO is a master, and FIG. 1B illustrates transmitting/receiving a control signal in case a TX FIFO is a slave.

If a TX FIFO (transmit First-In-First-Out) is a master and a RX FIFO (receive First-In-First-Out) is a slave as illustrated in FIG. 1A, as a CA (cell available) signal notifying that cell can be received at the RX FIFO 20 is activated to a 'high' state, a CA of the TX FIFO 10 is transited from a 'low' state to a 'high' state, and if there is a cell to be sent from the TX FIFO 10, an Enb (enable) signal is activated from a 'high' state to a 'low' state.

In other words, the moment the Enb signal is transited to the 'low' state while the CA signal is being in the 'high' state, the TX FIFO 10 activates a SOC signal, which is a start signal for cell transmission, to a 'high' state to enable cell transmission.

Meanwhile, if the TX FIFO is a slave and the RX FIFO is a master as illustrated in FIG. 1b, as a CA signal notifying that the TX FIFO 10 has a cell to be transmitted is activated to a 'high' state, the CA of the RX FIFO 20 is transited to the 'high' state, and if there is storage in the RX FIFO 20, the Enb signal is activated from the 'high' state to the 'low' state.

As soon as the Enb (enable) signal is transited to the 'low' state while the CA signal of the RX FIFO 20 is being in the 'high' state, the RX FIFO 20 activates the SOC (start of cell) signal, which is the start signal for cell transmission as aforementioned, to the 'high' state and receives a cell.

The following are definitions of signals that are shown in FIGS. 1A and 1B. Those signals conform to the ATM forum standard.

TX-CLK, RX-CLK (Clock): System synchronous clock;
TX-CA (Cell Available): A signal indicating whether or not there is a cell to be sent;
RX-CA: A signal indicating that a cell can be received;
TX-Enb (Enable): A signal indicating that cell transmission is enabled;
RX-Enb: A signal indicating that there is storage for a cell;
SOC (Start Of Cell): A signal indicating start of cell transmission; and
DAT (DATa): A signal indicating a cell data that is currently being transmitted.

The above signals are utilized for cell transmission. The following describes how cell transmission is actually done using these signals.

Figure 2:
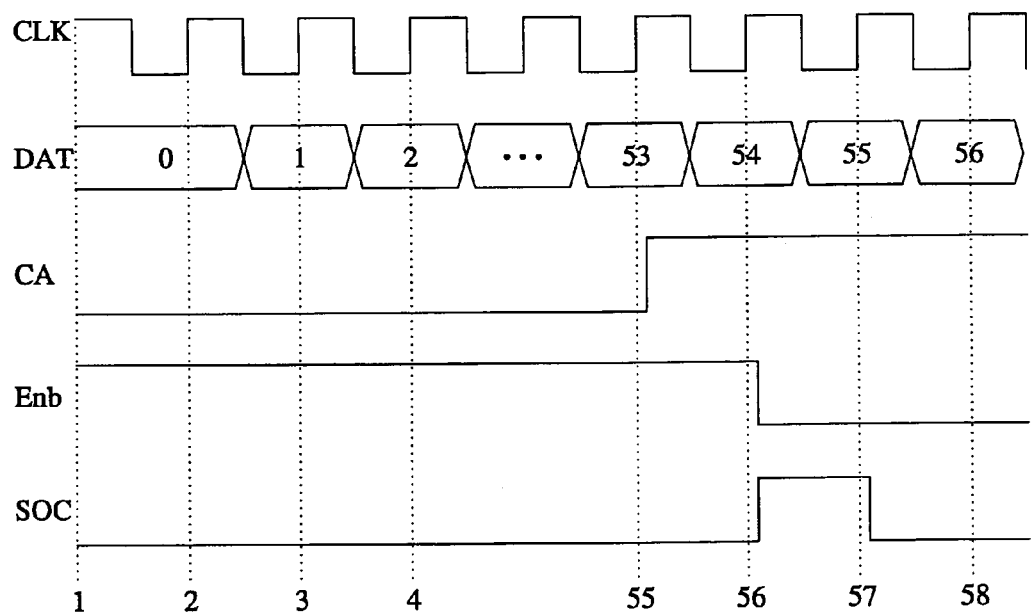
FIG. 2 is a timing chart describing a method for controlling start timing of cell transmission on a basis of 53 bytes according to a related art.

FIG. 2 is a timing chart describing a method for controlling start timing of cell transmission on a basis of 53 bytes according to a related art.

Referring to FIG. 2, the RX FIFO 20 outputs all of ATM cells to a destination and if the DAT count is 53, the CA signal is transited to a 'high' state. Hence, the CA signal at a clock edge 55 is transited to the 'high' state and a clock edge 57 starts receiving the ATM cells.

More specifically speaking, if the TX FIFO is a master, the RX FIFO 20 does not change the CA signal in the 'low' state until it is enabled to store cell data with 53 bytes in length. Therefore, when the RX FIFO 20 has a space for storing another 53-byte cell data after outputting all of the 53-byte cell data to the destination, the CA signal is transited to the 'high' state and the transmit enable signal Enb is activated to the 'low' state and the SOC is transited to the 'high' state. Then it is ready to start cell transmission.

the other hand, if the TX FIFO is a slave, the TX FIFO 10 maintains the CA signal in the 'low' state until all of 53 bytes of cell data are stored. As soon as the 53-byte cell data is all stored, the CA signal is transited to the 'high' state and the Enb signal indicating that the RX FIFO 20 is ready to receive the cell is activated to the 'low' state, thereby starting cell transmission.

To be short, if the TX FIFO is a master, the CA signal is kept in the 'low' state until storage for another 53-byte cell is created in the RX FIFO 20. Hence the RX FIFO 20 is put in an idle state until the 53-byte cell is processed.

In like manner, if the TX FIFO is a slave, the CA signal is kept in the 'low' state until 53-byte data gets stored in the TX FIFO 10. Hence the TX FIFO 20 is put in an idle state while storing a 53-byte cell.

In reality, however, when a cell is stored in or outputted from the FIFO, a 53-byte cell is piled up in the FIFO or outputted from the FIFO successively. For instance, it is least likely to happen that only 20 bytes out of 53 bytes of a cell are stored first and the remaining 33 bytes are stored after a short interruption.

Therefore, when cell data transmission is controlled according to the related art, the TX FIFO has to wait until all of the 53 bytes are stored while the RX FIFO has to wait until storage for a 53-byte data is created, thereby wasting as much as 53 bytes*clock.

A preferred embodiment of the present invention will be described herein below with reference to the accompanying drawings. In the following description, well-known functions or constructions are not described in detail since they would obscure the invention in unnecessary detail.

Before describing a method for controlling a cell between First-In-First-Out (FIFO), it will be helpful to know FIFO signals (cell available signal, enable signal) that are essential for cell control.

When a cell is stored in or outputted from a FIFO, each cell is piled up in the FIFO or outputted from the FIFO successively.

Therefore, in a FIFO on a receiving side (hereinafter referred to as 'RX FIFO') if a 1-byte data is outputted while the FIFO is full, at least one cell data, namely 53-byte data, will be outputted from then.

In a FIFO on a sending side (hereinafter referred to as 'TX FIFO') if a 1-byte cell is inputted when the FIFO does not even have a single byte data, at least one cell data (53 bytes) can be stored from then.

From this aspect, a cell available (hereinafter referred to as 'CA') signal and an enable (hereinafter referred to as 'Enb') signal which are basis of start timing for cell transmission between FIFOs are defined below.

First, the CA signal is transited to an active state (high signal) when the TX FIFO 10 has at least 1-byte data to be transmitted and when the RX FIFO 20 is enabled to receive greater than 1-byte data.

The Enb signal is transited to an active state (low signal) when the TX FIFO 10 has at least 1-byte data to be transmitted and the input CA signal is in a 'high' state, and when the RX FIFO 20 is enabled to receive greater than 1-byte data and the input CA signal is in a 'high' state.

Figure 3:
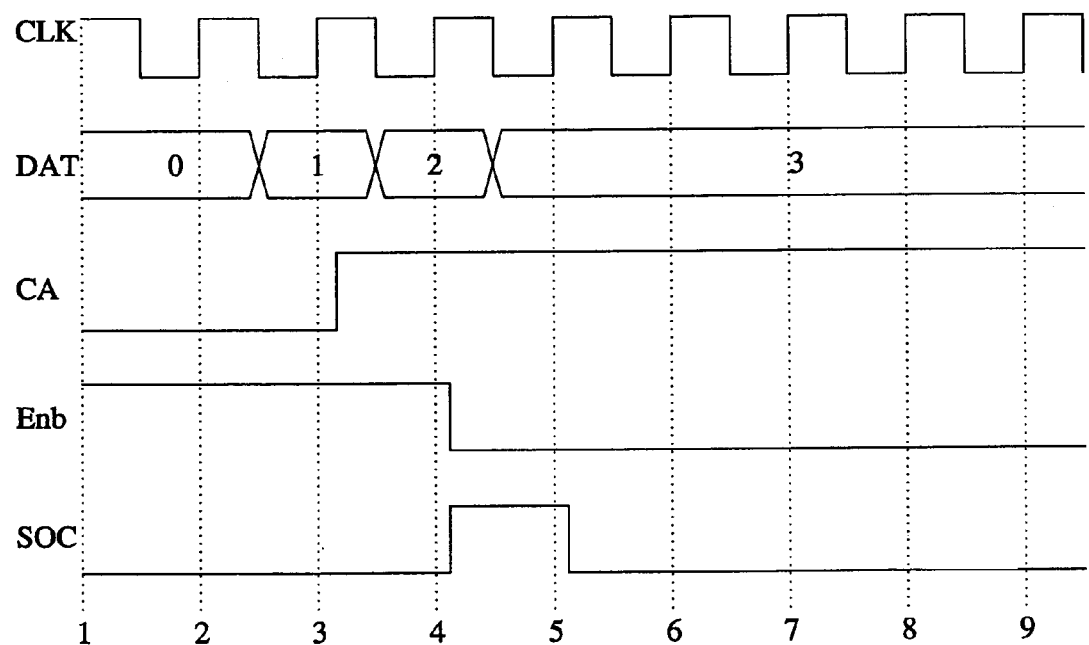
FIG. 3 is a group of waveforms describing a method for controlling start timing of cell transmission on a basis of 1-byte according to a preferred embodiment of the present invention.

Given that the FIFO signals (CA signal, Enb signal) are defined, now is turned to a procedure for actually transmitting/receiving a cell between FIFOs as illustrated in FIG. 3.

FIG. 3 is a group of waveforms describing a method for controlling start timing of cell transmission on a basis of 1-byte according to a preferred embodiment of the present invention.

The first example is when the TX FIFO 10 is a master.

Suppose that the TX FIFO 10 is storing a cell with greater than 1 byte for transmission.

When the RX FIFO 20 starts outputting an ATM cell to a destination, extra space for receiving data in the RX FIFO 20, DAT count, is increased. When the RX FIFO 20 starts outputting a cell to a destination at clock edge 2, the RX DAT count becomes 1. If the RX DAT count is 1, the RX CA at clock edge 3 is transited to a 'high' state.

Since the TX FIFO 10 already stores a cell to transmit, the RX CA in the high state is latched at clock edge 4, and the RX Enb signal is transited to a 'low' state. In this manner, cell transmission is ready to start.

After clock edge 4, because a cell is output from/stored in the RX FIFO 20 simultaneously from this point, the RX DAT count is kept at 3.

To be short, when the RX FIFO 20 starts outputting a cell at clock edge 2, the RX FIFO 20 starts receiving a new cell at clock edge 5.

Compared to the related art in which cell transmission starts at clock edge 57, the above method can receive a cell at clock edge 5, saving time as much as 52*clock.

Now the following describes when the TX FIFO 10 is a slave.

Suppose that the RX FIFO 20 has data storage greater than 1 byte.

In this state, the TX FIFO 10 has more than 1 ATM cell to transmit so DAT count to be transmitted from the TX FIFO 10 is increased. When the TX FIFO 10 starts storing data to be transmitted at clock edge 2, the TX DAT count becomes 1. When the TX DAT count is 1, TX CA is transited to a 'high' state at clock edge 3.

Since there is storage for data in the RX FIFO 20, cell transmission can be started by latching the TX CA in the 'high' state at clock edge 4 and transiting the TX Enb signal to a 'low' state.

After clock edge 4, because a cell is output from/stored in the TX FIFO 10 simultaneously from this point, the TX DAT count is kept at 3.

Shortly speaking, when the TX FIFO 10 starts outputting a cell at clock edge 2, the TX FIFO 10 starts receiving a new cell at clock edge 5.

Compared to the related art in which cell transmission starts at clock edge 57, the above method can receive a cell at clock edge 5, saving time as much as 52*clock.

In the meantime, the same benefits can be obtained by applying the above-described method to the Octet-level handshaking mode. Using this method, a UTOPIA interface in ATM mode can transmit a cell (data) much faster.

The present invention can be realized as computer-readable media having computer-executable instructions performing the data transmission method stated in the preceding paragraphs of the specification. The computer-readable media includes all possible kinds of recording media in which computer-readable data is stored. The computer-readable media include storing media, such as magnetic storage media (e.g., ROMs, floppy disks, hard disk, and the like), optical reading media (e.g., CD-ROMs (compact disc-read-only memory), DVDs (digital versatile discs), re-writable versions of the optical discs, and the like), system memory (read-only memory, random access memory), flash memory. The stored computer-readable data may be transmitted via carrier waves (e.g., transmission via the Internet). Also, the computer-readable media can store computer-readable codes that are distributed in computers connected via a network.

In conclusion, the method of the present invention can be advantageously used for improving traffic performance of system by defining start timing of cell transmission, or a signal that is used as a base to determine whether or not to start cell transmission (e.g. CA signal, Enb signal), between FIFOs of a UTOPIA interface storing ATM cells to be activated when a 1-byte data is stored or there is storage for 1-byte data. As a result, it is possible to transmit a cell much faster by as much as 52 bytes*clock.

While the invention has been shown and described with reference to certain preferred embodiments thereof, it will be understood by those skilled in the art that various changes in form and details may be made therein without departing from the spirit and scope of the invention as defined by the appended claims.

The present invention also discloses a computer-readable medium storing a data structure when a transmit first-in-first-out unit of Universal Test and Operations Physical layer Interface for an Asynchronous Transfer Mode (UTOPIA) interface is a master in a process of controlling cell transmission on a basis of 1-byte between first-in-first-out units of a universal test and operations physical layer interface for asynchronous transfer mode interface in a cell-level handshaking mode. The data structure may contain five data fields: when a receiving first-in-first-out of UTOPIA interface starts outputting an asynchronous transfer mode cell to a destination, a first field containing data representing increment of space for receiving data in the receiving first-in-first-out, and increment of a first count, with the first count being a signal indicating a cell data that is currently being transmitted; a second field containing data representing the setting of the first count to be one when the receiving first-in-first-out unit starts outputting the cell to a destination at a second clock edge; a third field containing data representing a transition of a receiving first signal at a third clock edge to a high state when the first count is one, with the receiving first signal indicating that the cell can be received; a fourth field containing data representing a latching of the receiving first signal in the high state at a fourth clock edge and transiting a receive enable signal to a low state, with the receive enable signal indicating that there is adequate storage space for the asynchronous transfer mode cell; and a fifth field containing data representing sustaining the first count at three after the fourth clock edge as the cell is output from and stored in the receive first-in-first-out simultaneously after the fourth clock edge, the receive first-in-first-out starting to receive a new cell at a fifth clock edge.

The present invention also discloses a computer-readable medium storing a data structure when a transmit first-in-first-out unit of Universal Test and Operations Physical layer Interface for an Asynchronous Transfer Mode (UTOPIA) interface is a slave in the process of controlling cell transmission on a basis of 1-byte between first-in-first-out units of a universal test and operations physical layer interfaces for asynchronous transfer mode interface in a cell-level handshaking mode. The data structure may contain five data fields: a sixth field containing data representing an increment of the first count to be transmitted from the transmit first-in-first-out unit; a seventh field containing data representing a setting of the first count to be one when the transmit first-in-first-out unit starts storing the data to be transmitted at the second clock edge; a eighth field containing data representing a transition of a transmit first signal at the third clock edge to a high state when the first count is one, with the transmit first signal indicating whether the asynchronous transfer mode cell is ready to be sent; a ninth field containing data representing a latching of the transmit first signal in the high state at the fourth clock edge and transiting a transmit enable signal to a low state, with the transmit enable signal indicating that cell transmission is enabled; and a tenth field containing data representing a sustainment of the first count at three after the fourth clock edge as the cell is output from and stored in the transmit first-in-first-out simultaneously after the fourth clock edge, the transmit first-in-first-out initiating a reception of a new cell at the fifth clock edge.

What is claimed is:

1. A method, comprising of:
   controlling cell transmission on a basis of 1-byte between first-in-first-outs of a universal test and operations physical layer interface for asynchronous transfer mode interface in a cell-level handshaking mode by activating a receive cell available signal at a first clock edge when a receive first-in-first-out of Universal Test and Operations Physical layer Interface for an Asynchronous Transfer Mode (UTOPIA) interface has a storage space for data having a length greater than one byte, when a transmit first-in-first-out of Universal Test and Operations Physical layer Interface for an Asynchronous Transfer Mode (UTOPIA) interface is a master and the receive first-in-first-out is a slave;
   latching, at the transmit first-in-first-out, the activated receive cell available signal from a second clock edge immediately following the first clock edge;

activating a transmit enable signal, when the transmit first-in-first-out stores more than 1-byte cell for transmission; and activating a receive enable signal.

2. The method according to claim 1, further comprising activating a receive start signal becomes when both of the receive cell available signal and the receive enable signal become active, and starting transceiving the cell between the receive first-in-first-out and the transmit first-in-first-out when said receive start signal is activated.

3. The method according to claim 1, wherein the receive cell available signal becomes active when the receive cell available signal is transited to a high state.

4. The method according to claim 1, wherein the receive enable signal becomes active when the receive enable signal is transited to a low state.

5. The method according to claim 2, wherein the receive start of cell signal becomes active to a high state when both of the receive cell available signal becomes active to a high state and the receive enable signal becomes active to a low state, and starting transmitting the cell.

6. The method according to claim 1, wherein a receive start of cell signal becomes active when the receive cell available signal and the receive enable signal become active, accommodating a starting of cell transmission.

7. A method, comprising the steps of:
controlling cell transmission on a basis of 1-byte between first-in-first-outs of a universal test and operations physical layer interface for asynchronous transfer mode interface in a cell-level handshaking mode by activating a transmit cell available signal at a first clock edge when a transmit first-in-first-out of Universal Test and Operations Physical layer Interface for Asynchronous Transfer Mode (UTOPIA) interface stores more than 1-byte cell for transmission, when the transmit first-in-first-out is a slave and a receive first-in-first-out of (UTOPIA) interface is a master;

latching, at the receive first-in-first-out, the activated transmit cell available signal from a second clock edge immediately following the first clock edge;

activating a receive enable signal, when the transmit first-in-first-out has storage for greater than 1-byte data; and activating a transmit enable signal.

8. The method according to claim 7, further comprising activating a transmit start signal when both of the transmit cell available signal and the transmit enable signal become active, and starting transceiving the cell between the receive first-in-first-out and the transmit first-in-first-out when said transmit start signal is activated.

9. The method according to claim 7, wherein the transmit cell available signal becomes active when the transmit cell available signal is transited to a high state.

10. The method according to claim 7, wherein the transmit enable signal becomes active when the transmit enable signal is transited to a low state.

11. The method according to claim 8, wherein the transmit start of cell signal becomes active to a high state when both of the transmit cell available signal becomes active to a high state and the transmit enable signal becomes active to a low state, and starting transmitting the cell.

12. The method according to claim 7, wherein a transmit start of cell signal becomes active when the transmit cell available signal and the transmit enable signal become active, accommodating a starting of cell transmission.

13. A method, comprising:
when a receive first-in-first-out of Universal Test and Operations Physical layer Interface for an Asynchronous Transfer Mode (UTOPIA) starts outputting an asynchronous transfer mode cell to a destination and when a transmit first-in-first-out of Universal Test and Operations Physical layer Interface for an Asynchronous Transfer Mode (UTOPIA) is a master, increasing space for receiving data in the receive first-in-first-out, increasing a first count, the first count being a signal indicating a cell data that is currently being transmitted;

setting the first count to be one when the receiving first-in-first-out starts outputting the cell to a destination at a second clock edge;

transiting a receiving first signal at a third clock edge to a high state when the first count is one, with the receiving first signal indicating that the cell can be received;

latching the receiving first signal in the high state at a fourth clock edge and transiting a receive enable signal to a low state, with the receive enable signal indicating that a storage space is available for the cell; and sustaining the first count at three after the fourth clock edge as the cell is output from and stored in the receive first-in-first-out simultaneously after the fourth clock edge, the receive first-in-first-out starting to receive a new cell at a fifth clock edge.

14. The method according to claim 13, when the transmit first-in-first-out is a slave, further comprising:
increasing the first signal count to be transmitted from the transmit first-in-first-out;

setting the first count to be one when the transmitting first-in-first-out starts storing the data to be transmitted at the second clock edge;

transiting a transmit first signal at the third clock edge to a high state when the first count is one, with the transmit first signal indicating whether or not there is a cell to be sent;

latching the transmit first signal in the high state at the fourth clock edge and transiting a transmit enable signal to a low state, with the transmit enable signal indicating that cell transmission is enabled; and sustaining the first count at three after the fourth clock edge as the cell is output from and stored in the transmit first-in-first-out simultaneously after the fourth clock edge, the transmit first-in-first-out starting to receive a new cell at the fifth clock edge.

15. An apparatus, comprising:
a first unit being a transmit first-in-first-out of a universal test and operations physical layer interface for asynchronous transfer mode interface;

a second unit being a receive first-in-first-out of a universal test and operations physical layer interface for asynchronous transfer mode interface, said second unit connected to said first unit; said second unit activating a cell available signal of the second unit at a first clock edge when said second unit has a storage space for data having a length greater than one byte, when the first unit is a master and the second unit is a slave;

the first unit latching the activated receive cell available signal from a second clock edge immediately following the first clock edge, and activating an enable signal of the first unit, when the first unit stores more than 1-byte cell for transmission, an enable signal of the second unit being activated; and a clock providing a clock signal to both of said first and second units simultaneously.

16. The apparatus of claim 15, when said first unit is a slave and said second unit is a master, further comprised of activating a cell available signal of the first unit when said first unit stores more than 1-byte cell for transmission, the second unit latching the activated cell available signal of the first unit from the second clock edge immediately following the first clock edge, and activating an enable signal of said second unit, when said second unit has storage for greater than 1-byte data, and an enable signal of said first unit being activated.

17. The apparatus of claim 15, with a receive start signal becomes active when both of the cell available signal of the second unit and the enable signal of the second unit become active, and accommodating the start of cell transmission, the cell available signal of the second unit becomes active when the cell available signal of the second unit is transited to a high state, the enable signal of the second unit becomes active when the enable signal of the second unit is transited to a low state.

18. The apparatus of claim 16, with a transmit start signal becomes active when both of the cell available signal of the first unit and the enable signal of the first unit become active accommodating the start of cell transmission, the cell available signal of the first unit becomes active when the cell available signal of the first unit is transited to a high state, the transmit enable signal becomes active when the enable signal of the first unit is transited to a low state.

19. A computer-readable medium having computer-executable instructions for performing a method, said method comprising:
   activating a receive cell available signal at a first clock edge when a receive first-in-first-out of Universal Test and Operations Physical layer Interface for Asynchronous Transfer Mode (UTOPIA) interface has a storage space for data having a length greater than one byte, when a transmit first-in-first-out of UTOPIA interface is a master and the receive first-in-first-out is a slave;
   latching, at the transmit first-in-first-out, the activated receive cell available signal from a second clock edge immediately following the first clock edge;
   activating a transmit enable signal, when the transmit first-in-first-out stores more than 1-byte cell for transmission; and
   activating a receive enable signal.

20. The computer-readable medium having computer-executable instructions for performing the method according claim 19, said method further comprising:
   activating a transmit cell available signal at a first clock edge when a transmit first-in-first-out of Universal Test and Operations Physical layer Interface for Asynchronous Transfer Mode (UTOPIA) interface stores more than 1-byte cell for transmission, when the transmit first-in-first-out is a slave and a receive first-in-first-out of (UTOPIA) interface is a master;
   latching, at the receive first-in-first-out, the activated transmit cell available signal from a second clock edge immediately following the first clock edge;
   activating an enable signal of the receive first-in-first-out, when the transmit first-in-first-out has storage for greater than 1-byte data; and
   activating an enable signal of the transmit first-in-first-out.

21. A computer-readable medium having stored thereon a data structure comprising:
   when a receiving first-in-first-out unit starts outputting an asynchronous transfer mode cell to a destination and when a transmit first-in-first-out unit is a master, a first field containing data representing an increment of space for receiving data in the receiving first-in-first-out unit and an increment of a first count, with the first count being a signal indicating a cell data that is currently being transmitted;
   when the receiving first-in-first-out unit starts outputting the cell to a destination at a second clock edge, a second field containing data representing a setting of the first count to be one;
   a third field containing data representing a transition of a receiving first signal at a third clock edge to a high state when the first count is one, with the receiving first signal indicating that the cell can be received;
   a fourth field containing data representing a latching of the receiving first signal in the high state at a fourth clock edge and transiting a receive enable signal to a low state, with the receive enable signal indicating that there is adequate space storage for the asynchronous transfer mode cell; and
   a fifth field containing data representing a sustainment of the first count at three after the fourth clock edge as the cell is output from and stored in the receive first-in-first-out unit simultaneously after the fourth clock edge, the receive first-in-first-out unit starting to receive a new cell at a fifth clock edge.

22. The computer-readable medium having stored thereon a data structure according to claim 21, when the transmit first-in-first-out is a slave, further comprising:
   a sixth field containing data representing an increment of the first count to be transmitted from the transmit first-in-first-out;
   a seventh field containing data representing a setting of the first count to be one when the transmitting first-in-first-out unit initiates a storage of the data to be transmitted at the second clock edge;
   a eighth field containing data representing a transition of a transmit first signal at the third clock edge to a high state when the first count is one, with the transmit first signal indicating whether the asynchronous transfer mode cell is ready to be sent;
   a ninth field containing data representing a latching of the transmit first signal in the high state at the fourth clock edge and transiting a transmit enable signal to a low state, with the transmit enable signal indicating that cell transmission is enabled; and
   a tenth field containing data representing a sustainment of the first count at three after the fourth clock edge as the cell is output from and stored in the transmit first-in-first-out simultaneously after the fourth clock edge, the transmit first-in-first-out initiating a reception of a new cell at the fifth clock edge.

* * * * *